United States Patent
Dezonno et al.

(10) Patent No.: US 7,197,132 B2
(45) Date of Patent: *Mar. 27, 2007

(54) ADAPTIVE TRANSACTION GUIDANCE

(75) Inventors: Anthony Dezonno, Bloomingdale, IL (US); Jeffrey Hodson, Wheaton, IL (US); Roger Sumner, Batavia, IL (US); Carlo Bonifazi, Woodridge, IL (US); Mark Michelson, Elburn, IL (US); Robert Beckstrom, Bolingbrook, IL (US); Mark Power, Carol Stream, IL (US); Craig Shambaugh, Wheaton, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 695 days.

This patent is subject to a terminal disclaimer.

(21) Appl. No.: 10/103,454

(22) Filed: Mar. 21, 2002

(65) Prior Publication Data
US 2003/0179877 A1   Sep. 25, 2003

(51) Int. Cl.
*H04M 5/00* (2006.01)

(52) U.S. Cl. .............................. 379/265.07; 379/266.07

(58) Field of Classification Search .............. 379/88.01, 379/266.07, 201, 265.07, 88.02, 88.04; 704/275, 704/9, 257
See application file for complete search history.

(56) References Cited

U.S. PATENT DOCUMENTS

| | | | |
|---|---|---|---|
| 4,943,995 A | 7/1990 | Daudelin et al. | |
| 5,555,179 A | 9/1996 | Koyama et al. | |
| 5,559,855 A | 9/1996 | Dowens et al. | |
| 5,566,229 A | 10/1996 | Hou et al. | |
| 5,596,634 A | 1/1997 | Fernandez et al. | |
| 5,765,033 A | 6/1998 | Miloslavsky | |
| 5,822,727 A | 10/1998 | Garberg et al. | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 * | 1/2001 | Macleod Beck et al. | ... 709/224 |
| 6,175,563 B1 | 1/2001 | Miloslavsky | |

(Continued)

FOREIGN PATENT DOCUMENTS

GB    2333173 A  *  7/1999

*Primary Examiner*—Duc M. Nguyen
*Assistant Examiner*—My Nguyen
(74) *Attorney, Agent, or Firm*—Welsh & Katz, Ltd.

(57) ABSTRACT

A method and apparatus are provided for guiding a conversation between an agent of a call center and a client of the call center towards one of a plurality of goals of an organization controlling the call center. The method includes the steps of recognizing a voice content of the client of the call center, correlating the recognized voice content with a first goal of the plurality of goals of the call center and presenting script to the agent of the call center based upon the correlated goal of the call center.

23 Claims, 1 Drawing Sheet

U.S. PATENT DOCUMENTS

| | | |
|---|---|---|
| 6,175,564 B1 | 1/2001 | Miloslavsky et al. |
| 6,185,292 B1 | 2/2001 | Miloslavsky |
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,411,687 B1 * | 6/2002 | Bohacek et al. .......... 379/88.21 |
| 6,523,061 B1 * | 2/2003 | Halverson et al. .......... 709/202 |
| 6,721,416 B1 * | 4/2004 | Farrell .................... 379/265.07 |
| 6,732,156 B2 | 5/2004 | Miloslavsky |
| 2005/0047394 A1 * | 3/2005 | Hodson et al. .............. 370/352 |

* cited by examiner

ADAPTIVE TRANSACTION GUIDANCE

FIELD OF THE INVENTION

The invention relates to communication systems and more particularly to call centers.

BACKGROUND OF THE INVENTION

Call-centers are generally known. A call-center is typically used wherever a large number of calls must be handled for some common enterprise. Typically, the calls of the enterprise are routed through the call-center as a means of processing the calls under a common format.

Call-centers typically include at least three elements: an automatic call distributor (ACD), a group of agents for handling the calls, and a host computer containing customer information. The individual agents of the groups of agents are each typically provided with a telephone console and a computer terminal. The telephone terminal receives customer calls distributed to the agent by the ACD. The terminal may be used to retrieve customer records from the host.

Call-centers are typically automated in the delivery of calls to agents and in the retrieval of customer records for use by agents. Features within the Public Switch Telephone Network (PSTN) such as dialed number identification service (DNIS) and automatic number identification (ANI) may be used to determine not only the destination of the call, but also the identity of the caller. DNIS and ANI information, in fact, may be delivered by the PSTN to the ACD in advance of call delivery.

Based upon the destination of the call and identity of the caller, the ACD may select the agent most qualified to service the call. By sending an identifier of the selected agent along with the identity of the caller to the host, the host may automatically retrieve and download customer records to the agent's terminal at the same instant as the call arrives.

While call-centers are effective, the skill level of agents varies considerably. To simplify and add consistency to call handling, agents are often provided with written scripts to follow during conversations with customers. While such scripts help, they may prove ineffective in the case of a customer who asks questions or otherwise does not allow the agent to follow the prepared script. Accordingly, a need exists for a way of making sales presentations that is not limited to a predetermined format.

DETAILED DESCRIPTION OF AN ILLUSTRATED EMBODIMENT

Figure 1:
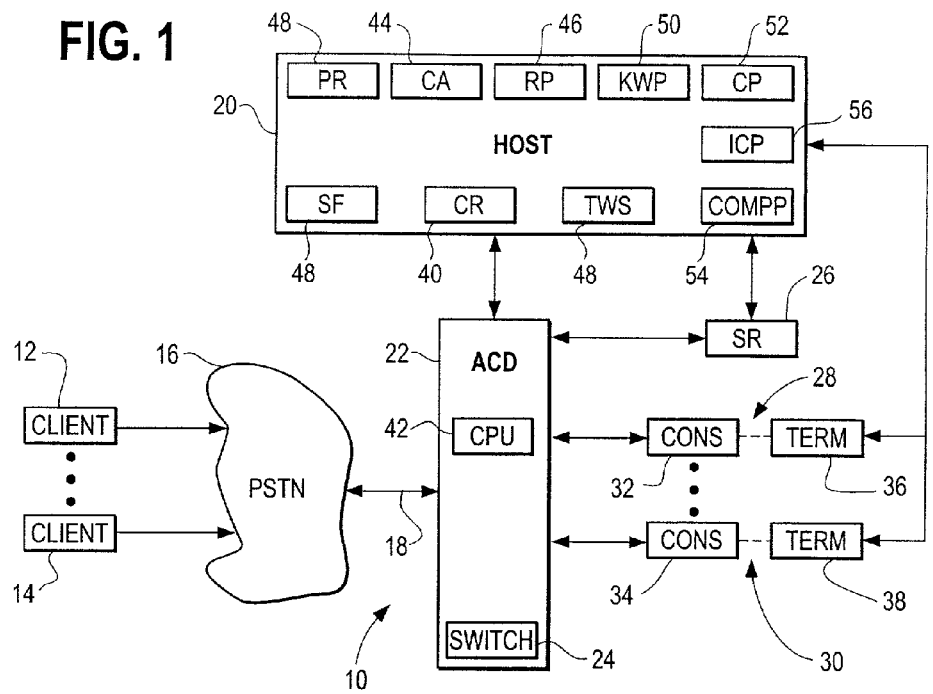
FIG. 1 is a block diagram of a call center in accordance with an illustrated embodiment of the invention.

FIG. 1 is a block diagram of a call center 10, shown generally under an illustrated embodiment of the invention. Under the illustrated embodiment, calls may be received from (or placed to) clients (e.g., customers) 12, 14 through a public switch telephone network (PSTN) 16.

The call center 10 may be used by an organization (e.g., a merchant, a political organization, etc.) to setup call connections through the PSTN between an external client of the organization and a selected agent of the organization for purposes of advancing the agenda of the organization.

For example, where the organization is a merchant, the call center 10 may be structured around a telephone connection (e.g., a set of incoming trunk lines) 18 with the PSTN 16. The merchant may advertise its wares through television or newspaper ads. The ads may provide one or more telephone numbers associated with the telephone connection 18 of the message processing system 10. If the organization has many organizational divisions (e.g., a department store), then a separate telephone number may be provided for each department.

In order to service telephone calls, the call processing system 10 may have a number of agent stations 28, 30. Each agent station 28, 30 may be provided with a telephone console 32, 34 and a computer terminal 36, 38.

The call processing system 10 may also function to place outgoing calls to clients. In support of outgoing calls, the call processing system 10 may maintain a list of telephone numbers of clients 12, 14 within a set of client records 40. A host 20 may retrieve telephone numbers from the client records 40, as needed, and transfer the numbers to the automatic call distributor (ACD) 22.

The host 20 may transfer the numbers to a central processing unit (CPU) 42 within the ACD 22. The CPU 42 may monitor the activity of the agents 28, 30 and place calls to clients 12, 14 through the PSTN 16 in anticipation of agents 28, 30 becoming available.

As the CPU 42 places or receives calls, it assigns a call identifier to the call and opens a call record for the call. If the call is an outgoing call, then the call record would include at least the telephone number of the called party and, possibly, an identifier of the call campaign triggering the call. If the call is an incoming call, then the call record may include call associated information. Call associated information may include ANI or DNIS information delivered from the PSTN 16 to the ACD 22 along with the call.

In the case of outgoing or incoming calls, the CPU 42 may send a call arrival message containing the information of the call record to the host 20. In the case of outgoing calls, the call arrival message may be sent when the called party answers and the CPU 42 determines that the call has not been answered by an answering machine. In the case of incoming calls, the call arrival message may be sent upon detection of the call on an inbound trunk line.

Upon receiving the call arrival message, the host 20 may retrieve customer records from a customer database 40. On outgoing calls, the telephone number of the called party may be used as an identifier of customer files. On incoming calls, ANI information may be used as the identifier.

Upon retrieving any customer records, an agent 28, 30 may be selected for handling the call. Agent selection may be accomplished by an agent selection application (not shown) operating within the host 20 or CPU 42. Agent selection may be based upon any criteria (e.g., past customer purchases, customer preferences, objectives of an outgoing call campaign, etc.).

Once an agent is selected, the CPU 42 may instruct the switch 24 to couple the call to the telephone console 32, 34 of the selected agent 28, 30. The CPU 42 may also send a "call routed" message to the host 20 including the call identifier and selected agent 28, 30. In response, the host 20 may deliver customer records to the terminal 36, 38 of the selected agent 28, 30 as a screen pop coincident with call delivery to the agent.

In addition to delivering customer records to the terminal 36, 38 of the selected agent 28, 30, the host 20 may also provide script to be read by the selected agent 28, 30 to the customer 12, 14. The script may be tailored to the call campaign in the case of outgoing calls, to the subject matter of the called number in the case of incoming calls, or to the customer. Further, the script may be dynamically changed based upon customer questions or comments.

The exchange between agent 28, 30 and client may be detected and decoded by a pair of a speech recognition (SR) processors 26 connected to each conversation via a three-party connection provided through the switch 24. One SR processor 26 may be connected to the inbound path to recognize words spoken by the client (e.g., customer) 12, 14. A second SR processor 26 may be connected to the outbound path to recognize words spoken by the selected agent 28, 30.

Figure 2:
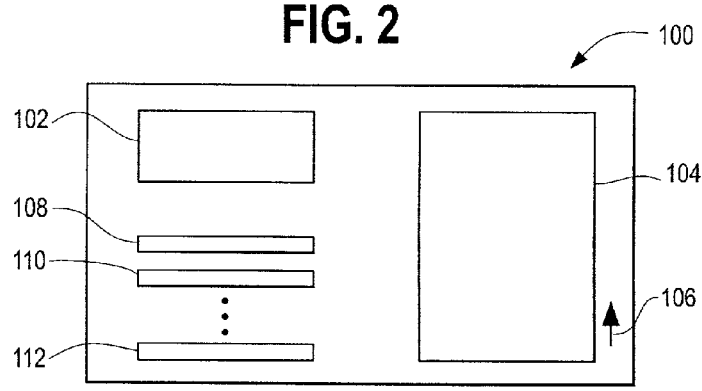
FIG. 2 depicts a screen that may be displayed by the system of FIG. 1.

FIG. 2 depicts a screen 100 that may be presented on a terminal 36, 38 to the selected agent 28, 30 upon connection of a call to the agent 28, 30. Along a first side, a script 104 may be provided for recitation by the agent 28, 30 to the customer 12, 14. Customer records 102 may be presented along a second side of the screen 100.

Once the customer 12, 14 is connected with the selected agent 28, 30, the agent 28, 30 may begin reading from the script 104. As the agent 28, 30 recites content from the script 104, the SR processor 26 may recognize the spoken words of the agent 28, 30 and cause the script 104 to scroll 106 upwards to reveal additional script 104.

A content analysis (CA) application 44 operating from within the host 20 may function to guide the conversation based upon the spoken words of the customer 12, 14, the agent 28, 30 and the objectives of the organization operating the call center 10. The CA application 44 may receive the recognized words of the selected agent 28, 30 and customer 12, 14.

A key word processor 50 may detect key words in the statements of both customer 12, 14 and agent 28, 30. A content processor 52 may impart a meaning to the customer's comments by evaluating the key words of the customer 12, 14 using the generally understood meaning of the key words and the use of the key words in the context of the conversation with the agent 28, 30.

A comparison processor 54 may compare the key words of the customer with another predetermined set of key words provided by the organization that may be used to describe the subject matter of the conversation between the customer 12, 14 and agent 28, 30, other products of the organization and competitor's products. The comparison may be used to generate a set of subject matter differences.

An information control processor 56 may use the imparted meaning, the subject matter differences and other factors (e.g., an emotional state of the customer 12, 14) to adjust primary and subsidiary goals under which the CA application 44 operates. The subject matter differences may be compared with threshold values to identify a need to shift objectives. The imparted meaning and key words may be compared with indicia associated with other primary and subsidiary goals to identify a best fit. Goals and script may be adjusted accordingly.

For simplicity, reference to the CA application 44 may also refer to operations performed within the key word processor 50, content processor 52, comparison processor 54 and information control processor 56. References to operation of the individual elements have been omitted so as not to obscure the overall operation and benefits of the invention.

As a very simple example, a blind call may be routed to an agent 28, 30. The caller 12, 14 may say "I am interested in product A". The CA application 44 (and supporting applications) may recognize the caller's words and correlate the words with the goal of selling product A. A script 104 supporting the sale of product A may be retrieved and presented to the agent 28, 30, accordingly.

In the case of the agent 28, 30 and in the absence of significant input from the customer 12, 14, the CA application 44 may simply receive the spoken words of the agent 28, 30, recognize and correlate the words with the goal of presentation of a complete script to a customer, compare the recognized words with individual entries of the script 104 and continue to cause the script 104 to scroll 106 upwards as the script is read.

The script 104 may be provided as a detailed description that may be structured differently depending upon the organizational goals for each type of call. Script 104 intended for use in an outgoing call campaign by a merchant, for example, may be tightly focused on the goal of the sale of a particular product. In contrast, the script 104 intended for use with an unidentified caller (i.e., the ANI of the caller cannot be related to any known customer) may be relatively loosely organized around an opportunities goal and the direction of the conversation may be controlled in the beginning by the content of the caller's spoken words.

Once a product, service or information concept is identified, the detailed description provided by the script 104 for each type of call may proceed along a predetermined path presenting the most significant features of the product first and least significant features last. However, in presenting the information to the customer 12, 14, one of the subsidiary goals is the education of the customer 12, 14 regarding the products of the organization.

By monitoring and recognizing the speech input from the customer 12, 14, any subject matter difference (e.g., between a currently presented script 104 and the customer's question) may allow the order of presentation to be altered and correlated to specific organizational goals (e.g., customer education regarding the organization's products) based upon customer input. For example, if the customer 12, 14 should ask a question related to one of the features of a product (out of the predetermined order), then the CA application 44 may simply rearrange the order, presenting the subject of the customer query, first, out of sequence. Following the response to the customer query, the CA application 44 may return to the predetermined path (with deletions made for already presented matter).

Figure 3:
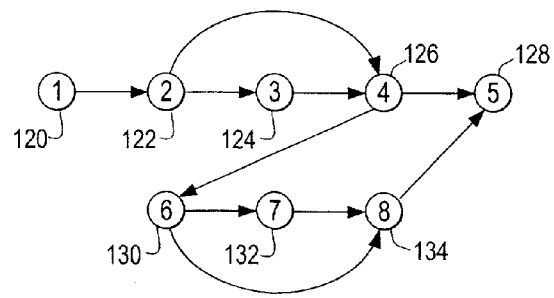
FIG. 3 depicts a content flow diagram that may be followed by the system of FIG. 1.

FIG. 3 depicts content presentation steps of a simplified presentation scenario for an outgoing call of a call campaign under an illustrated embodiment of the invention. The call routed message to the host 20 from the CPU 42 may notify the host 20 of the identity of the call campaign and agent 28, 30 assigned for handling the call.

The call routed message may be passed to the CA application 44. The CA application 44 may use the identifier of the particular call campaign involved from the routed message to retrieve the associated script 104 from a script file 48 that also contains scripts 104 for many other different types of calls. In turn, the retrieved script 104 may then be presented to the selected agent 28, 30 for use in conversing with the client 12, 14.

Under the illustrated embodiment, the script may follow a predetermined path that proceeds from step #1 120 through steps #2–4 122, 124, 126 to step #5 128. Step #1 may be a greeting and announcement of the reason for the call. Step #2 may be a simple inquiry by the selected agent 28, 30 as to whether or not the customer 12, 14 is familiar with the subject matter of the call. If the answer is no, then the script may proceed directly from step #2 122 to step #3 124.

If the SR application 26 detects a "yes" answer, then the CA application 44 may detect the affirmative answer and correlate the answer with the organizational goal of reducing the time that an agent spends on each call. In response, the CA application 44 may cause the script 104 to proceed directly from step #2 122 to step #4 126. Step #4 126 may be described as a closing script. In the case of a merchant, the closing script may involve an inquiry of whether the customer 12, 14 is interested in purchasing the product and, if the answer is in the affirmative, the collection of a credit card number and shipping address for any sold product. Step #5 128 may represent termination of the call.

The closing statement may represent the end of discussion related to one goal (i.e., sale of a first product) and the opportunity to address other goals (i.e., the sale of other products). For example, if the organization operating the call center is a merchant, then the closing script 126 and collection of payment and shipping information may be correlated to an up-selling opportunity. An application within the host 20 (e.g., a related products (RP) application 46) may function to identify products that may also interest the caller 12, 14. Related products may be products that merchant experience has shown are often sold with those already ordered and/or that the customer records 40 show are often purchased by this particular customer 12, 14.

The RP application 46 may function to identify related products and transfer identifiers of those products to the CA application 44. The CA application 44, in turn, may retrieve and present new script 104 asking the customer 12, 14 if he is interested in the related products.

If the SR processor 26 detects a "yes", then the CA application 44 may retrieve and present script drawn to the related product. At step #6 130, the agent 28, 30 may ask the customer 28, 30 if he is familiar with the related product. If the answer is "yes", then the correlated script may provide an abbreviated product description and proceed directly from step #6 130 to closing the sale at step #8 134 for collecting credit and addressing information. If the answer is "no", then the script may proceed through step #7 132 where a detailed discussion may ensue of the merits and price of the related product. From the detailed description of the products in step #7 132, the script 104 may proceed to closing the sale at step #8 134 and termination of the call at step #5 128.

As an alternative, to the short-cutting of the process steps of FIG. 3 described above, the customer 12, 14 may also ask questions, that inherently add process steps. For example, if in response to the agent's question about whether the customer 12, 14 is familiar with product "A", the customer 12, 14 responds by saying "yes, but I prefer product B", then the CA application may adopt a customer education goal related to comparative advantages and retrieve and present additional script 104 that describes the advantages of product "A" over product "B".

As a further alternative, in response to the query about whether the customer 12, 14 is familiar with product "A", the customer 12, 14 may respond by saying that he/she has already tried product "A". The inherent ambiguity of this answer would require the CA application 44 to adopt a clarification goal in order for any meaningful sales effort to continue.

To resolve the ambiguity, the CA application 44 may present a set of optional scripts 108, 110, 112 on the screen 100 for recitation by the agent 28, 30. One script (e.g., 108) may simply inquire "were you satisfied with your use of the product?" Another script (e.g., 110) may inquire "would you consider trying the product again?" A third optional script (e.g., 112) may simply ask "do you have any current interest in this product?"

If the customer 12, 14 should answer "yes" to one or more of the optional questions, then the CA application 44 may detect such affirmative answers and present either summary or detailed script to conclude a sale. Such script may be in the form "Would you care to purchase addition units of product A". If the answer is again affirmative, then the CA application 44 may move the presented script directly to step #4 126 where the agent 28 may ask for a credit card number and shipping date.

If the customer 12, 14 should answer "no" to one or all of the optional questions, then the CA application 44 may assume that continued effort would be fruitless and proceed to step #5 128. In step #5 128, the CA application 44 may simply retrieve and present script to terminate the call. The presented script may simply include the words "Thank you for your time—goodbye".

If, on the other hand, the customer 12, 14 simply states that "the product didn't work", then the CA application 44 may present the script "Do you mean it didn't work very well or it didn't work at all?"

Depending upon the answer, the CA application 44 may adopt a customer satisfaction goal and access product records 48 to identify records of contexts in which the product didn't work well or at all. Any located records corresponding to the description of the complaint may be presented as script to the agent 28, 30.

If the customer 12, 14 confirms the use of the product in a context contained in the identified records, the CA application 44 may then attempt to retrieve any available warranty and correction measures. If warranty and correction measures are available, the CA application 44 may include the recitation of such warranty or correction measure in the script read by the agent 28, 30. The CA application 28, 30 may also proceed to present script for a final inquiry, asking whether the customer wishes to purchase any further units of product A and then, based upon the answer, proceed as described above.

Blind calls or misdirected calls may also be processed by the system 10 of FIG. 1. A blind call is where the system 10 receives a call to a general number and cannot identify the caller. A misdirected call is one that is received by one department of an organization, but is intended for another.

In the case of the blind call, the CA application 44 may present a simple welcoming script (e.g., "this is the XYZ corporation, how may I help you?"). The caller may proffer a very general statement (e.g., "I'm looking for something for my house"). In response, the CA application 44 may search a products list for any product related to the request. Questions about related products may be presented in the optional script areas 108, 110, 112.

The goal of the scripts 108, 110, 112 presented may be to narrow the inquiry to something actually handled by the organization. As the caller 12, 14 answers in the negative to any question, that question may disappear and the agent 28, 30 may go on to the next question.

If the caller 12, 14 answers in the affirmative, then a detailed script 104 may appear or another set of more detailed optional scripts 108, 110, 112 may appear. If the agent 28, 30 recites the last option 112 and the call replies in the negative, then the CA application 44 may decide that it has no product suitable for the caller and may terminate the call with the appropriate scripted reply 104 (e.g., "I'm sorry, but we have no product of that type—goodbye").

As a very specific example, the organization may be a hardware store that sells hardware, wall coverings and some furniture, the options 108, 110, 112 in response to the general statement that the caller is looking for "something for his house" may include a series of questions that attempt to narrow the inquiry to a product actually sold by the store. The first optional script 108 may be "are you looking for hardware?" The second optional script 110 may be "are you looking for wall coverings?" The third optional script 112 may be "are you looking for furniture?"

If the caller 12, 14 answers in the affirmative to the first option, then the CA application 44 may present the further optional scripts directed to whether the caller is looking for tools, fittings or appliances. If the caller answers in the negative, then first optional script 108 disappears and the agent 28, 30 may ask the caller if he is looking for wall coverings.

If the caller 12, 14 answers in the affirmative to the second option, then the CA application 44 may present the further optional scripts directed to whether the caller is looking for paint or wallpaper. If the caller answers in the negative, then the second optional script 110 disappears and the agent 28, 30 may ask the caller if he is looking for furniture.

The process may continue until a specific product is identified. Once a specific product is identified, a script 104 directed to that product may be presented to the agent 28, 30 and the sale may proceed substantially as described above.

The SR processor 26 may also function to detect emotion by measuring a pitch and word rate of the voice of a client 12, 14 and also of the agent 28, 30. The measured pitch and word rate may be transferred to the CA application 44 for use in evaluating and adjusting a content of the script 104.

The CA application 44 may receive the measured pitch and word rate along with a list of trigger words (TWs) 48 to differentiate excitement from impatience to anger. For example, the TWs 48 may include such phrases as "don't bother me" or "take me off your call list" or "I'm not interested" or any of a number of well-known obsenities. The detection of trigger words and/or other indications of anger may cause the CA application 44 to terminate the conversation as discussed above.

Alternatively, if the SR processor 26 should detect words suggesting impatience (e.g., "I know all of that") or a rising voice pitch or word rate from the client 12, 14, then the CA application 44 may terminate the detailed description of step #3 124 and resort to the presentation of a summary script 104 of the product. If the CA application 44 should then detect questions from the client 12, 14 related to specific features, the CA application 44 may retrieve script 104 drawn only to those specific features.

A specific embodiment of a method and apparatus of for adaptively guiding transactions according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of guiding a conversation between an agent of a call center and a client of the call center towards one of a plurality of goals of an organization controlling the call center, such method comprising the steps of:

recognizing a voice content of the client of the call center and recognizing voice content of the agent;

correlating the recognized voice content with a first goal of the plurality of goals of the call center;

measuring information content differences between the recognized voice content of the client and the recognized voice content of the agent; and presenting script to the agent of the call center based upon the correlated goal of the call center and adjusting the goals in response to the information content differences.

2. The method of guiding a conversation as in claim 1 further comprising imparting meaning to the recognized voice content of the client and further adjusting the goals in response to the imparted meaning.

3. The method of guiding a conversation as in claim 2 further comprising scrolling the script in response to the recognized voice content of the agent as the agent recites the script to reveal additional scripts.

4. The method of guiding a conversation as in claim 1 further comprising detecting emotion by measuring emotion related parameters in the voice of the client and adjusting the goals in response to detected emotion.

5. The method of guiding a conversation as in claim 4 further comprising comparing a key word content of the recognized voice content of the client with the recognized voice content of the agent.

6. The method of guiding a conversation as in claim 5 further comprising comparing the detected difference in information content with a threshold value.

7. The method of guiding a conversation as in claim 6 further comprising comparing an information content of the conversation with an information content of each goal of the plurality of goals when the detected difference exceeds the threshold value.

8. The method of guiding a conversation as in claim 7 further comprising selecting a goal of the plurality of goals with a closest relative match to the information content of the conversation.

9. The method of guiding a conversation as in claim 8 further comprising comparing key words of the recognized voice content of the client for ambiguities.

10. The method of guiding a conversation as in claim 9 further comprising composing a question to resolve the ambiguity.

11. An apparatus for guiding a conversation between an agent of a call center and a client of the call center towards one of a plurality of goals of an organization controlling the call center, such apparatus comprising:

means for recognizing a voice content of the client of the call center and for recognizing voice content of the agent;

means for correlating the recognized voice content with a first goal of the plurality of goals of the call center;

means for measuring information content differences between the recognized voice content of the client and the recognized voice content of the agent; and means for presenting script to the agent of the call center based upon the correlated goal of the call center and for adjusting the goals in response to the information content differences.

12. The apparatus for guiding a conversation as in claim 11 further comprising means for imparting meaning to the recognized voice content of the client and further adjusting the goals in response to the imparted meaning.

13. The apparatus for guiding a conversation as in claim 12 further comprising means for measuring emotion related parameters in the recognized voice content of the client and adjusting the goals in response to the emotion related parameters.

14. The apparatus for guiding a conversation as in claim 13 further comprising means for comparing a key word content of the recognized voice content of the client with the recognized voice content of the agent.

15. The apparatus for guiding a conversation as in claim 11 further comprising means for comparing the information content differences with a threshold value.

16. The apparatus for guiding a conversation as in claim 15 further comprising means for comparing an information content of the conversation with an information content of each goal of the plurality of goals when the detected difference exceeds the threshold value.

17. The apparatus for guiding a conversation as in claim 16 further comprising means for selecting a goal of the plurality of goals with a closest relative match to the information content of the conversation.

18. The apparatus for guiding a conversation as in claim 17 further comprising means for comparing key words of the recognized voice content of the client for ambiguities.

19. The apparatus for guiding a conversation as in claim 18 further comprising means for composing a question to resolve the ambiguity.

20. The apparatus for guiding a conversation as in claim 19 further comprising means for presenting the composed question to the client.

21. An apparatus for guiding a conversation between an agent of a call center and a client of the call center towards one of a plurality of goals of an organization controlling the call center, such apparatus comprising:
- a first speech recognition application adapted to recognize a voice content of the client of the call center and voice content of the agent;
- information control processor adapted to correlate the recognized voice content with a first goal of the plurality of goals of the call center, to measure information content differences between the recognized voice content of the client and the recognized voice content of the agent, and to adjust the goals in response to the information content differences; and
- a monitor adapted to present script to the agent of the call center based upon the correlated goal of the call center.

22. The apparatus for guiding a conversation as in claim 21 further comprising second speech recognition application adapted to impart meaning to the recognized voice content of the client and further adjust the goals in response to the imparted meaning.

23. The apparatus for guiding a conversation as in claim 22 further comprising a comparison processor adapted to measure emotion related parameters of the recognized voice content of the client and to adjust the goals in response to the emotion related parameters.

* * * * *